(12) United States Patent
Asahara

(10) Patent No.: US 10,574,849 B2
(45) Date of Patent: Feb. 25, 2020

(54) IMAGE FORMING APPARATUS, CONTROL METHOD OF IMAGE FORMING APPARATUS, AND PROGRAM

(71) Applicant: CANON KABUSHIKI KAISHA, Tokyo (JP)

(72) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/380,773

(22) Filed: Apr. 10, 2019

(65) Prior Publication Data

US 2019/0238704 A1  Aug. 1, 2019

Related U.S. Application Data

(63) Continuation of application No. 14/634,380, filed on Feb. 27, 2015, now Pat. No. 10,291,807.

(30) Foreign Application Priority Data

Mar. 3, 2014 (JP) .................................. 2014-040074
Feb. 5, 2015 (JP) .................................. 2015-020872

(51) Int. Cl.
  *H04N 1/00* (2006.01)
  *G06F 21/60* (2013.01)
  (Continued)

(52) U.S. Cl.
  CPC ....... *H04N 1/00856* (2013.01); *G06F 21/604* (2013.01); *G06F 21/84* (2013.01); *H04N 1/4406* (2013.01); *H04N 2201/0094* (2013.01)

(58) Field of Classification Search
  CPC .......... G06F 21/31; G06F 21/33; G06F 21/44; G06F 21/445; G06F 21/45; G06F 21/00; G06F 21/57; G06F 21/577; G06F 21/629; G06F 21/6209; G06F 21/6218; G06F 21/71; G06F 21/51; G06F 21/54; G06F 21/46; G06F 21/604; G06F 21/84; G06F 21/0846; H04L 63/104; H04L 63/20; H04L 63/10; H04L 63/102; H04L 63/083; H04L 63/16; H04N 1/4406; H04N 1/00856
  (Continued)

(56) References Cited

U.S. PATENT DOCUMENTS

2004/0243805 A1* 12/2004 Enokida .............. H04L 63/0823
                                                              713/175
2006/0143685 A1*  6/2006 Vasishth ............... G06F 21/577
                                                              726/1

(Continued)

*Primary Examiner* — Chad Dickerson
(74) *Attorney, Agent, or Firm* — Canon U.S.A., Inc. IP Division

(57) ABSTRACT

An import unit of an image forming apparatus performs control as follows. If an import target setting value corresponds to a device setting, the import unit determines whether the setting value complies with the security rule. If it is determined that the setting value complies with the security rule, the import unit executes the import processing of the setting value. If it is determined that the setting value does not comply with the security rule, the import unit does not execute the import processing of the setting value. Further, if an import target setting value corresponds to an individual setting, the import unit executes the import processing of the setting value regardless of the security rule.

6 Claims, 11 Drawing Sheets

(51) Int. Cl.
*H04N 1/44* (2006.01)
*G06F 21/84* (2013.01)

(58) Field of Classification Search
USPC ..... 358/1.11–1.18, 1.9, 2.1; 726/1–7, 16–21, 726/28; 713/182, 183; 715/733, 734, 715/735, 741, 742, 743
See application file for complete search history.

(56) References Cited

U.S. PATENT DOCUMENTS

2006/0259960 A1* 11/2006 Kondo ............... G06F 21/46
 726/6
2009/0299972 A1* 12/2009 Merchant ........... H04L 63/0823

* cited by examiner

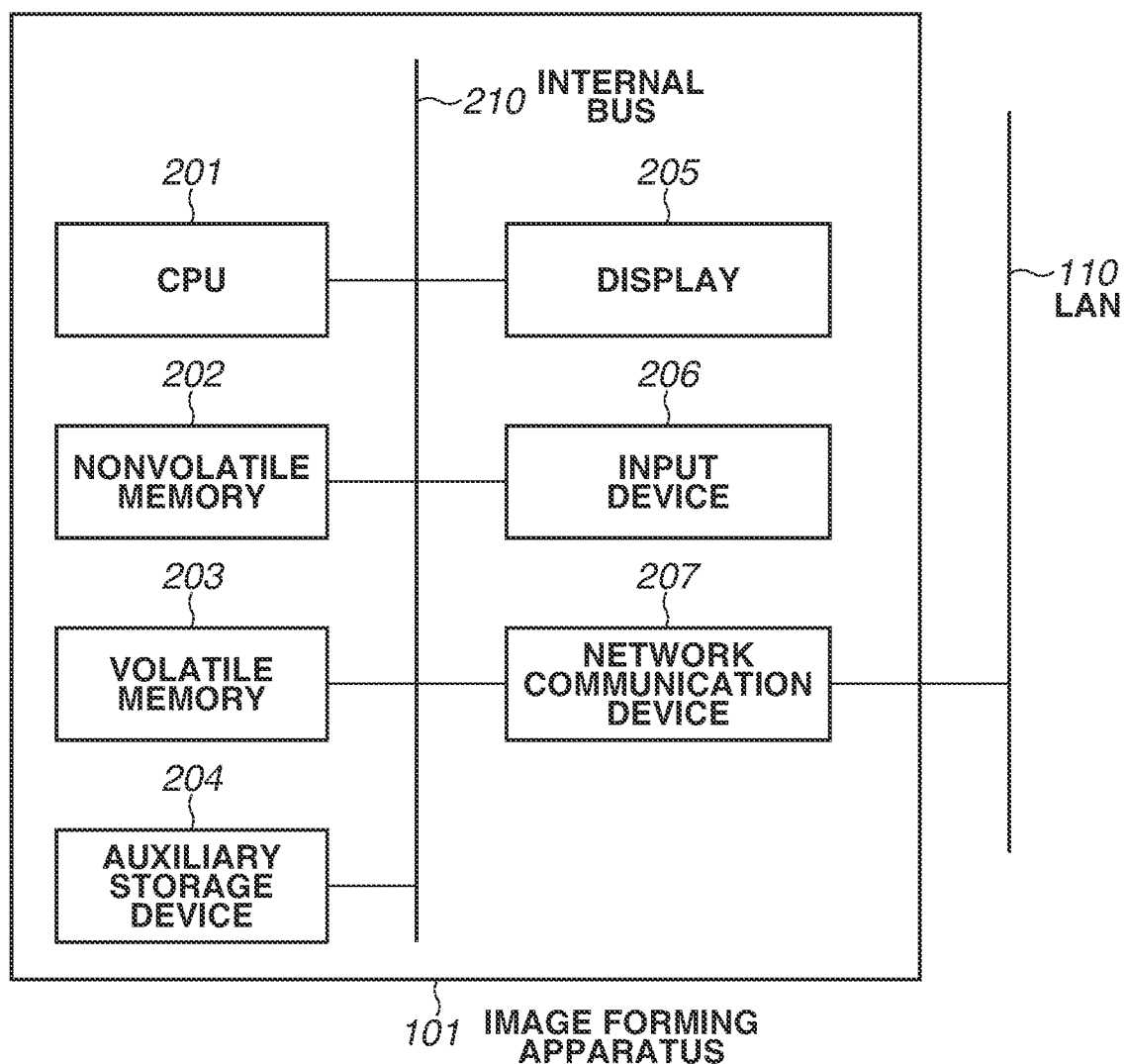

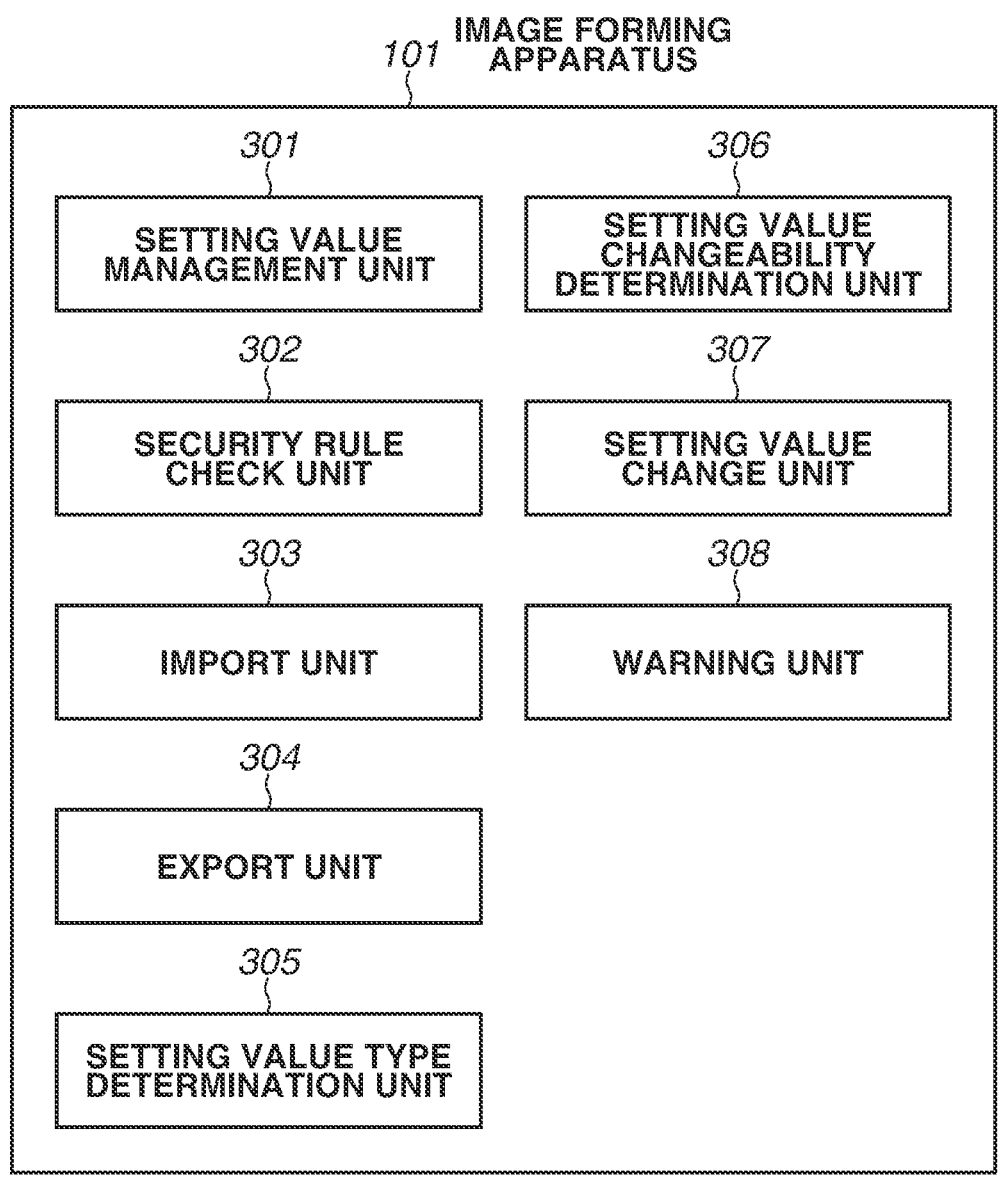

FIG. 4A

| NUMBER | NAME | CONTENT |
|---|---|---|
| 1 | PASSWORD COMPLEXITY | MORE THAN TWO CHARACTERS |
| 2 | KEY STRENGTH IN SSL COMMUNICATION | ARBITRARILY SET |

| IDENTIFIER | SETTING NAME | APPLICATION RANGE | VALUE | RULE NUMBER | RULE DETERMINATION RESULT |
|---|---|---|---|---|---|
| DEVICE SETTING | SMTP PASSWORD | EXTERNAL | ab | 1 | OK |
| DEVICE SETTING | SMB PASSWORD | DEVICE | abcd | 1 | OK |
| DEVICE SETTING | SSL CERTIFICATE | DEVICE | CERTIFICATE 1 | 2 | OK |

| IDENTIFIER | SETTING NAME | APPLICATION RANGE | VALUE | RULE NUMBER | RULE DETERMINATION RESULT |
|---|---|---|---|---|---|
| USER A | LOGIN PASSWORD | DEVICE | ab | 1 | OK |
| USER A | MY FOLDER URL | EXTERNAL | ¥192.168.0.1¥a¥ | — | OK |
| USER A | MY FOLDER PASSWORD | EXTERNAL | ab | 1 | OK |
| USER B | LOGIN PASSWORD | DEVICE | ab | 1 | OK |
| USER B | MY FOLDER URL | EXTERNAL | ¥192.168.0.1¥b¥ | — | OK |
| USER B | MY FOLDER PASSWORD | EXTERNAL | ab | 1 | OK |

| NUMBER | NAME | CONTENT |
|---|---|---|
| 1 | PASSWORD COMPLEXITY | MORE THAN FOUR CHARACTERS |
| 2 | KEY STRENGTH IN SSL COMMUNICATION | STRONG |

FIG.5B

| NUMBER | NAME | CONTENT |
|---|---|---|
| 1 | PASSWORD COMPLEXITY | MORE THAN FOUR CHARACTERS |
| 2 | KEY STRENGTH IN SSL COMMUNICATION | STRONG |

| CATEGORY | NAME | APPLICATION RANGE | VALUE |
|---|---|---|---|
| DEVICE SETTING | SMTP PASSWORD | EXTERNAL | abcd |
| DEVICE SETTING | SMB PASSWORD | DEVICE | a |
| DEVICE SETTING | SSL CERTIFICATE | DEVICE | CERTIFICATE 1 |
| USER A | LOGIN PASSWORD | DEVICE | abcd |
| USER B | LOGIN PASSWORD | DEVICE | abcd |

FIG.5C

| CATEGORY | NAME | APPLICATION RANGE | VALUE |
|---|---|---|---|
| DEVICE SETTING | SMTP PASSWORD | EXTERNAL | abcd |
| DEVICE SETTING | SMB PASSWORD | DEVICE | a |
| DEVICE SETTING | SSL CERTIFICATE | DEVICE | CERTIFICATE 1 |
| USER A | LOGIN PASSWORD | DEVICE | abcd |
| USER B | LOGIN PASSWORD | DEVICE | abcd |

FIG. 6A

| NUMBER | NAME | CONTENT |
|---|---|---|
| 1 | PASSWORD COMPLEXITY | MORE THAN FOUR CHARACTERS |
| 2 | KEY STRENGTH IN SSL COMMUNICATION | STRONG |

| IDENTIFIER | SETTING NAME | APPLICATION RANGE | VALUE | RULE NUMBER | RULE DETERMINATION RESULT |
|---|---|---|---|---|---|
| DEVICE SETTING | SMTP PASSWORD | EXTERNAL | ab | 1 | NG (WARNING IS REQUIRED) |
| DEVICE SETTING | SMB PASSWORD | DEVICE | abcd | 1 | OK |
| DEVICE SETTING | SSL CERTIFICATE | DEVICE | CERTIFICATE 2 | 2 | OK (WARNING IS REQUIRED) |

| IDENTIFIER | SETTING NAME | APPLICATION RANGE | VALUE | RULE NUMBER | RULE DETERMINATION RESULT |
|---|---|---|---|---|---|
| USER A | LOGIN PASSWORD | DEVICE | ab | 1 | NG (WARNING IS REQUIRED) |
| USER A | MY FOLDER URL | EXTERNAL | ¥192.168.0.1¥a¥ | — | OK |
| USER A | MY FOLDER PASSWORD | EXTERNAL | ab | 1 | NG (WARNING IS REQUIRED) |
| USER B | LOGIN PASSWORD | DEVICE | ab | 1 | NG (WARNING IS REQUIRED) |
| USER B | MY FOLDER URL | EXTERNAL | ¥192.168.0.1¥b¥ | — | OK |
| USER B | MY FOLDER PASSWORD | EXTERNAL | ab | 1 | NG (WARNING IS REQUIRED) |

411 / 412 / 413 / 414 / 415 / 416

IMAGE FORMING APPARATUS, CONTROL METHOD OF IMAGE FORMING APPARATUS, AND PROGRAM

CROSS-REFERENCE TO RELATED APPLICATIONS

This application is a Continuation of U.S. patent application Ser. No. 14/634,380, filed Feb. 27, 2015, which claims the benefit of Japanese Patent Applications No. 2014-040074, filed Mar. 3, 2014, and No. 2015-020872, filed Feb. 5, 2015, all of which are hereby incorporated by reference herein in their entirety.

BACKGROUND OF THE INVENTION

Field of the Invention

The present invention relates to a technique for managing a setting value in an environment in which an image forming apparatus is operated in compliance with a security rule.

Description of the Related Art

Conventionally, there are image forming apparatuses in which a security rule can be set. The security rule is a setting in which a guideline not to damage the security of operations is established as a rule. In such image forming apparatuses, check processing of the security rule is operated in the image forming apparatus so that a setting not complying with the security rule cannot be accepted.

In addition, many image forming apparatuses have a user authentication function. Each authenticated user can individually record a customized setting as an individual setting. Further, the image forming apparatuses generally have a function of importing and exporting a setting value so as to efficiently manage setting values of a plurality of image forming apparatuses.

If a setting value is imported into the conventional image forming apparatus without considering a security rule in an environment in which the security rule is set, the image forming apparatus could be in danger of being used by the setting not complying with the security rule. Therefore, when a setting value is imported, it is required to check whether the setting value complies with the security rule.

Japanese Patent Application Laid-Open No. 2002-247033 discusses a technique which changes a security state of a managing target system to comply with the security rule so as to prevent a setting not complying with the security rule from being accepted.

However, the technique discussed in Japanese Patent Application Laid-Open No. 2002-247033 does not consider a setting individually customized by each user as an individual setting. Therefore, when the individual setting violating the security rule is imported, the import fails. For example, in the case that an administrator distributes a file including a plurality of setting value groups to a plurality of image forming apparatuses in a batch to perform import processing, a setting value included in the file, such as authentication information of a general user other than the administrator, sometimes does not comply with the security rule, and in such a case, the import fails. In this case, the general user cannot log in the image forming apparatus using a user account of his/her own. Thus, an administrative user needs to ask all general users to generate again the import data complying with the security rule and retry the import, which takes an immense amount of time and effort.

SUMMARY OF THE INVENTION

The present invention is directed to the provision of a mechanism capable of reducing time and effort in management by flexibly importing a setting value while taking the security rule into consideration.

According to an aspect of the present invention, an image forming apparatus includes a management unit configured to manage a security rule, a control unit configured to control import processing of a setting value, a reception unit configured to receive a setting value to be a target of import processing, and a first determination unit configured to determine, if the received setting value corresponds to a device setting common to all users, whether the setting value complies with the security rule, wherein if the first determination unit determines that the setting value corresponding to the device setting complies with the security rule, the control unit executes the import processing of the setting value, and if the first determination unit determines that the setting value corresponding to the device setting does not comply with the security rule, the control unit does not execute the import processing of the setting value, and wherein if the received setting value corresponds to an individual setting of each user, the control unit executes the import processing of the setting value regardless of the security rule.

Further features of the present invention will become apparent from the following description of exemplary embodiments with reference to the attached drawings.

BRIEF DESCRIPTION OF THE DRAWINGS

FIG. 2 illustrates an example of a hardware configuration of the image forming apparatus.

FIG. 3 illustrates an example of a software configuration of the image forming apparatus.

FIGS. 4A to 4C are examples of setting values of the image forming apparatus.

FIGS. 5A to 5C are examples of import data.

FIGS. 6A to 6C are examples of setting values after import.

DESCRIPTION OF THE EMBODIMENTS

Figure 1:
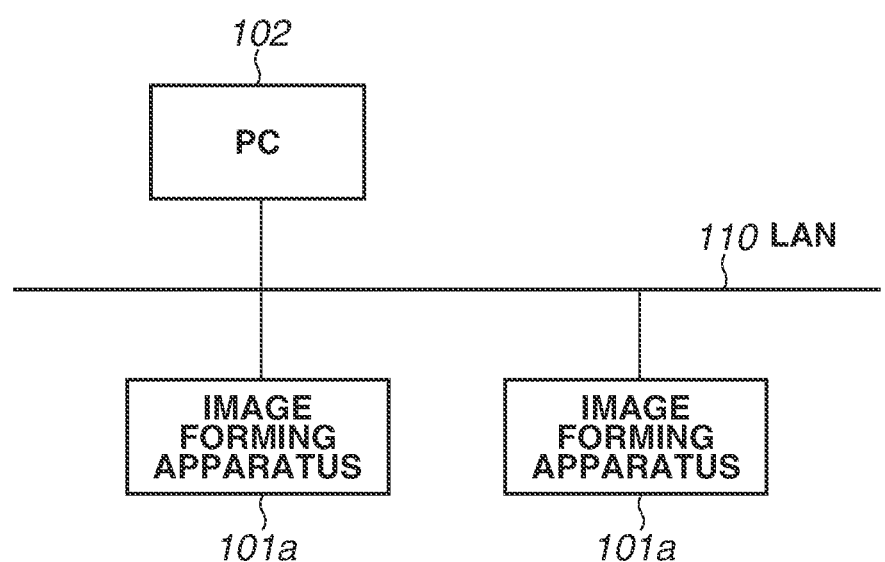
FIG. 1 illustrates an example of a network system including an image forming apparatus according to the present invention.

An exemplary embodiment, features, and aspects of the invention will be described in detail below with reference to the drawings.

First, terms used in the specification are defined. A user is a person who uses functions of image forming apparatuses 101a and 101b illustrated in FIG. 1. All image forming apparatuses are collectively referred to as the image forming apparatus 101 on occasion. An administrative user is a user who manages the image forming apparatus 101 and can use all functions provided by the image forming apparatus 101. A general user is a user other than the administrative user and can use a part of the functions provided by the image forming apparatus 101. According to the present exemplary embodiment, functions that only the administrative user can use include an import function of a setting value and a change function of the security rule, which are described below.

User authentication is to determine a type of a user who intends to use the image forming apparatus 101. "The user is authenticated" refers to a state in which the user is determined as the administrative user, the general user, or a wrong user.

A setting refers to data for switching a behavior of the image forming apparatus 101. The setting is stored by a setting value management unit 301 illustrated in FIG. 3, which is described below, and software for realizing each function of the image forming apparatus 101 appropriately refers to the setting to operate. An individual setting refers to a setting individually customized for each user. The individual setting is stored by the setting value management unit 301 described below, and the stored setting can be used according to the authenticated user. A device setting refers to a setting common to all users with respect to the image forming apparatus 101. In other words, the same device setting is applied to any user.

A security rule is a rule regarding settings of the image forming apparatus 101 and a guideline to maintain the security at a specific level. The security rule includes descriptions of setting values which can and cannot be set to the image forming apparatus 101. For example, a security rule requiring a password to include four or more characters can be considered. The security rule is also referred to as a security policy. The security rule is stored and managed by the image forming apparatus 101.

An in-device management setting refers to a setting used within the image forming apparatus 101. For example, an authentication password to a Server Message Block (SMB) server provided by the image forming apparatus 101 is the in-device management setting. An external linkage setting refers to a setting which is required to be transferred to an external system when the image forming apparatus 101 cooperates with the external system. For example, a user name, a domain name, and a password character string used for accessing an external SMB server are the external linkage settings.

Import refers to an operation for taking settings (all settings or settings in a predetermined unit) of the image forming apparatus 101 into the image forming apparatus 101 in a batch. Import data refers to data to be imported. Export refers to an operation for taking out the settings (all settings or settings in a predetermined unit) of the image forming apparatus 101 from the image forming apparatus 101 in a batch. Export data refers to data to be exported. The export data has a same value as the import data, however the name changes depending on a viewpoint of the description. When the setting value is imported or exported, possibility of import or export is basically determined according to the above-described security rule.

FIG. 1 illustrates an example of a network system including the image forming apparatus as an exemplary embodiment according to the present invention.

The image forming apparatus 101 is an apparatus as typified by a multifunction peripheral having an image forming function. The image forming apparatus 101*a* and the image forming apparatus 101*b* both refer to the image forming apparatus 101. The image forming apparatus 101*a* and the image forming apparatus 101*b* may be different from each other in the details, such as a model. The image forming apparatus 101 can communicate with another information device (for example, a personal computer (PC) 102) connected to a local area network (LAN) 110 via the LAN 110. Functions of the image forming apparatus 101 are described in detail below with reference to FIGS. 2 and 3.

The PC 102 is a general personal computer and includes a network communicable function and a web browser. The PC 102 can communicate with another information device (for example, the image forming apparatus 101) connected to the LAN 110. The LAN 110 is a network which can perform digital communication. The image forming apparatus 101 and the PC 102 are connected and can mutually communicate with each other.

FIG. 2 is a block diagram illustrating an example of a hardware configuration of the image forming apparatus 101.

A central processing unit (CPU) 201 executes a program and controls various types of processing. A nonvolatile memory 202 is configured by a read-only memory (ROM) and stores a program and data necessary for an initial stage in start-up processing of a device. A volatile memory 203 is configured by a random access memory (RAM) and used as a temporary storage area of a program and data.

An auxiliary storage device 204 is configured by a large-capacity storage device, such as a hard disk and a RAM drive, and stores a large volume data, an executable code of a program, and setting values of the image forming apparatus 101. The auxiliary storage device 204 stores data which is required to be stored for a longer time comparing with data stored in the volatile memory 203. The auxiliary storage device 204 is a nonvolatile storage device, so that the data can be stored if the image forming apparatus 101 is turned off.

A display 205 is a display device for display information to a user. An input device 206 receives a selection instruction by a user and transmits the instruction to a program via an internal bus 210. The input device 206 includes, for example, hard keys, a touch panel formed on a surface of the display 205, and the like.

A network communication device 207 is a device for communicating with another information processing apparatus via a network. The internal bus 210 is a communication bus for connecting each hardware device in a communicable state in the image forming apparatus 101.

FIG. 3 is a block diagram illustrating an example of a software configuration of the image forming apparatus 101.

Each software module (herein below, referred to as a software unit) illustrated in FIG. 3 is realized by executing a program stored in the nonvolatile memory 202 or the auxiliary storage device 204 by the CPU 201 in the image forming apparatus 101. Various information pieces used in execution of the program by each software unit are stored in the volatile memory 203 or the auxiliary storage device 204, and the software units can exchange the various information pieces therebetween. Communication between each of the information devices on the network is performed using the network communication device 207 in the image forming apparatus 101.

Each of the software units is described below.

A setting value management unit 301 stores settings of the image forming apparatus 101. The setting value management unit 301 stores the settings in the auxiliary storage device 204 and can refer to the settings as necessary. The settings stored by the setting value management unit 301 include, for example, three settings, namely the security rule, the device setting, and the individual setting. However, other settings may be included. Examples of settings stored by the setting value management unit 301 are indicated in FIGS. 4A to 4C.

FIGS. 4A to 4C illustrate examples of settings stored by the setting value management unit 301.

FIG. 4A is an example of the security rule. A number 401 is a management number of the security rule. A name 402 is a name of the security rule. A content 403 is a content of the security rule.

Here, the security rule number "1", i.e. "password complexity", is a rule for registering a password having a predetermined number of characters or more. In FIG. 4A, a setting a character string with "more than two characters" is registered as the rule for the "password complexity", and a password character string with one character or less is controlled not to be registered by a security rule check unit 302 described below.

Further, the security rule number "2", i.e. "key strength in secure socket layer (SSL) communication", is a rule for setting an encryption strength of a key used in SSL communication to a predetermined strength or more. In FIG. 4A, if "arbitrarily" is set as the "key strength in SSL communication", there is no restriction, and if "strong" is set, a relatively weak encryption logic, such as Rivest-Shamir-Adleman (RSA) 1024 bit, is prohibited from being used in SSL communication. Here, two simple rules are described as examples of the security rule, however, different variations of rules can be employed.

FIG. 4B is an example of the device setting.

An identifier 411 is an identifier for identifying a setting. In the case of the device setting, "device setting" is stored in the identifier 411 as an identifier for indicating the device setting. A setting name 412 is a name of a setting value. An application range 413 indicates whether the setting is the in-device management setting or the external linkage setting. In the example in FIG. 4B, the in-device management setting is indicated by a "device", and the external linkage setting is indicated by "external". A value 414 is data actually allocated to the setting. A rule number 415 is the management number of the security rule related to the setting. According to the present exemplary embodiment, a configuration in which one setting is related to one or less security rule is described, however, one setting may be related to a plurality of security rules. A rule determination result 416 indicates a check result by the security rule check unit 302 described below. In the examples in FIGS. 4B and 4C, "OK" indicating that the value complies with the security rule is stored in all results. Another example is described below.

A "simple mail transfer protocol (SMTP) password" in the setting name 412 is a password for performing authentication in an SMTP server when an e-mail is transmitted from the image forming apparatus 101. The application range 413 is the "external". More specifically, it means that there is no point in changing a value on the image forming apparatus 101, because an e-mail cannot be transferred as long as the setting in the cooperating SMTP server is not changed. The value 414 is "ab". The rule number 415 is "1". It indicates that the setting is restricted by the security rule number "1" in FIG. 4A.

An "SMB password" in the setting name 412 is a password for accessing an SMB folder provided by the image forming apparatus 101. The application range 413 is the "device". This is because, if a value of the image forming apparatus 101 is changed, an operation will be available using the changed value. The value 414 is "abcd". The rule number 415 is "1". It indicates that the setting is restricted by the security rule number "1" in FIG. 4A.

An "SSL certificate" setting in the setting name 412 is a setting for selecting a server certificate used when communication with the image forming apparatus 101 is performed in Hypertext Transfer Protocol Secure (HTTPS). The application range 413 is the "device". This is because, if a value of the image forming apparatus 101 is changed, an operation will be available using the changed value. The value 414 is a "certificate 1". According to the present exemplary embodiment, a plurality of certificates created by a different means is stored by the image forming apparatus 101, and a certificate is selected from them. The "certificate 1" is a certificate created by RAS 1024 bit. The rule number 415 is "2". It indicates that the setting is restricted by the security rule number "2" in FIG. 4A.

FIG. 4C is an example of the individual setting.

The individual setting includes, similar to the device setting shown in FIG. 4B, the identifier 411, the setting name 412, the application range 413, the value 414, the rule number 415, and the rule determination result 416 and is managed. However, the identifier 411 in the individual setting stores an identifier for uniquely identifying a user who is an owner of the individual setting. According to the present exemplary embodiment, a user identification (ID) of a user is directly used as the identifier 411. However, a domain name may be combined therewith, and a random character string like a Universally Unique Identifier (UUID) may be allocated to the identifier 411. Descriptions of each setting in the individual settings are omitted.

It is returned to the descriptions of FIG. 3 hereinbelow.

The security rule check unit 302 checks whether a setting value which has been registered or will be registered in the setting value management unit 301 complies with the security rule. For example, regarding the rule of the "password complexity" in FIG. 4A, the setting values having "1" in the rule number 415 in FIG. 4B and FIG. 4C are check targets. When the administrative user intends to change the "SMB password" using the input device 206, the security rule check unit 302 refers to the rule number 415 of the setting corresponding to the "SMB password" and checks the relevant rule. If the changed SMB password has the setting of "one character or less", the security rule check unit 302 determines that the value does not comply with the security rule and performs control not to permit storage of the changed setting.

According to the present exemplary embodiment, a configuration is described in which the rule number 415 is provided to the device setting shown in FIG. 4B and the individual setting shown in FIG. 4C, and the number of the relevant security rule is stored. However, another configuration may be employed. For example, the device setting shown in FIG. 4B and the individual setting shown in FIG. 4C may have a configuration only storing a flag enabling determination of whether the setting is related to the security rule. In this configuration, an identifier for identifying a related setting value (for example, a combination of the identifier 411 and the setting name 412) is stored in the security rule setting table shown in FIG. 4A, and the security rule check unit 302 needs to determine which security rule is used for a check by referring to the identifier. Alternatively, a table for managing correspondence between an identifier for identifying a setting value (for example, a combination of the identifier 411 and the setting name 412) and the rule number 401 of the security rule is newly stored, and the security rule check unit 302 appropriately performs a check by referring to the table.

An import unit 303 performs import processing which transfers import data from the PC 102 to the image forming apparatus 101 via the LAN 110 and causes the setting value management unit 301 to store the import data. In this regard, a configuration may not include the PC 102. For example, the import unit 303 may import the import data stored in a Universal Serial Bus (USB) mass storage device via a USB host interface, not illustrated.

An export unit 304 performs export processing which converts the setting value stored in the setting value management unit 301 to export data and transfers the export data to the PC 102 via the LAN 110. A configuration may not include the PC 102. For example, the export unit 303 may export the export data to the USB mass storage device via the USB host interface, not illustrated.

A setting value type determination unit 305 determines a type of the setting value stored by the setting value management unit 301. There is a plurality of types to be determined, thus each type is described individually.

First one is a determination of two types of the device setting and the individual setting. The device setting and the individual setting are determined in such a manner that when information of a user identifier is included in the identifier 411 of the setting value, the type is determined as the individual setting, and when the information of the user identifier is not included in the identifier 411 of the setting value, the type is determined as the device setting. Another method may be used for the determination method. For example, a method for determining the setting value by setting a specific rule to an identifier allocated to the setting value may be used. Alternatively, a configuration may be employed which newly stores information indicating the individual setting or the device setting.

Second one is a determination of two types of the in-device management setting and the external linkage setting. This determination is made based on information of the application range 413. When the application range 413 is the "device", the type is determined as the in-device management setting, and when the application range 413 is the "external", the type is determined as the external linkage setting.

A setting value changeability determination unit 306 determines, when the setting value becomes a state not complying with the security rule, whether the state can be brought into a state complying with the security rule by automatically changing the setting value. In the case of a method for selecting the setting value from options, it is determined that the setting value can be automatically changed. Whereas in the case of a method for inputting a character string, such as a pass phrase, it is determined that the setting value cannot be automatically changed. According to the present exemplary embodiment, the setting value changeability determination unit 306 makes a determination by referring to the setting value stored by the setting value management unit 301, however, another configuration may be employed. For example, the device setting shown in FIG. 4B and the individual setting shown in FIG. 4C may be provided with fields for changeability and managed based on the fields. Alternatively, the device setting shown in FIG. 4B and the individual setting shown in FIG. 4C may be provided with fields indicating a value range and a data type of the setting value. In this case, information, such as an option, a value, and a character string, can be set as the data type, and an upper limit and a lower limit, the number of characters, and information about the option can be set as the value range. Then, the setting value changeability determination unit 306 determines that a setting value can be changed if the data type is the option and cannot be changed if the data type is other than that.

A setting value change unit 307 changes the setting value stored by the setting value management unit 301 to a value complying with the security rule and stores the setting value by the setting value management unit 301 again. As a prerequisite, the setting value change unit 307 performs processing on a setting which is determined as changeable by the setting value changeability determination unit 306.

Figure 7:
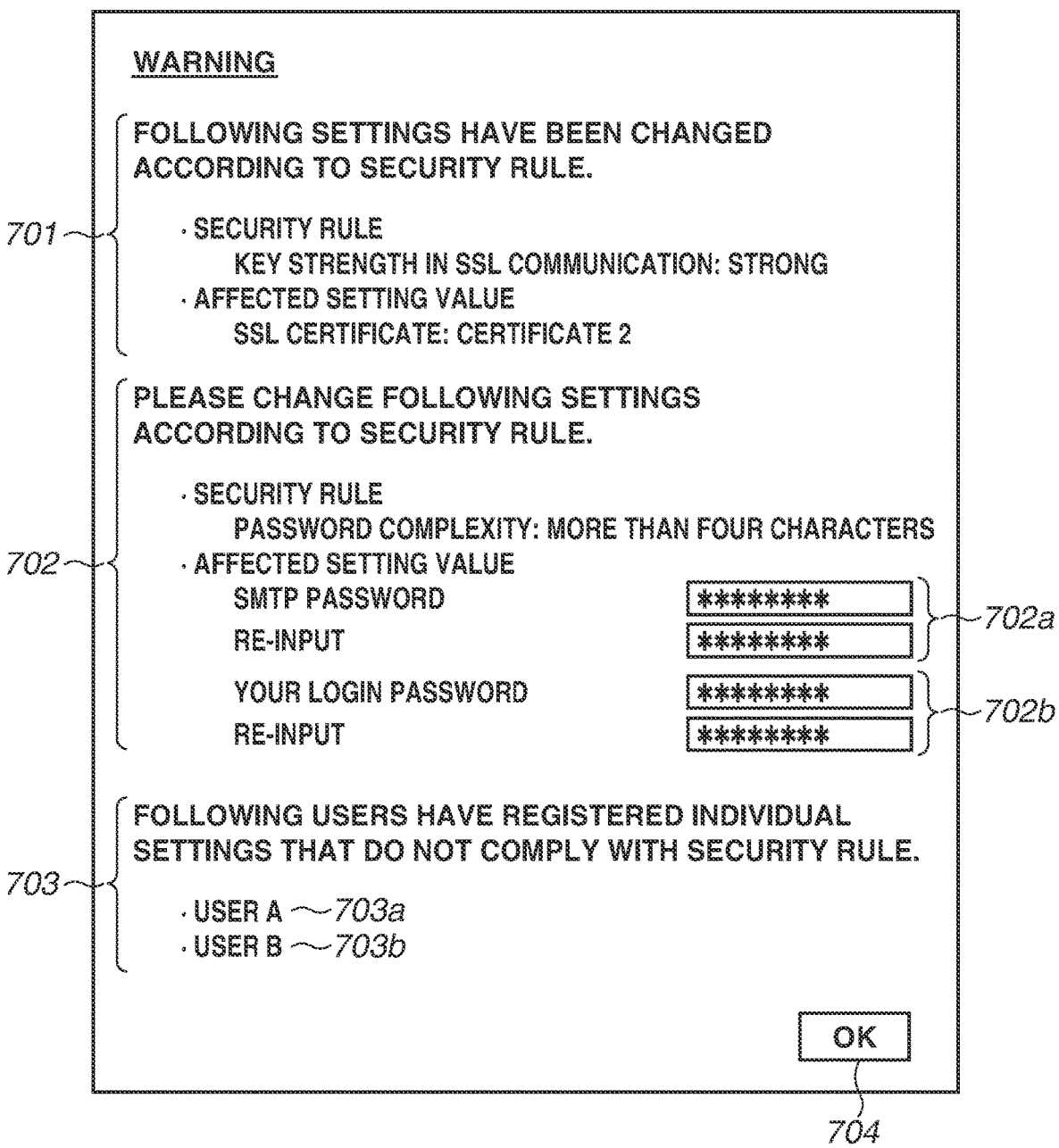
FIG. 7 illustrates an example of a warning screen at the time of import.

A warning unit 308 display a warning screen on the PC 102. There are two types of warning contents. First one is a warning display which is displayed when the administrative user imports import data, and as a result, a setting is changed to a value different from the import data in compliance with the security rule. Second one is a warning and an input screen which are displayed when the administrative user imports import data, and as a result, a user needs to manually input a setting. Examples of the warning screen are illustrated in FIGS. 7 and 8, which are described below. Specific warning contents are described below using a sequence diagram.

Figure 9:
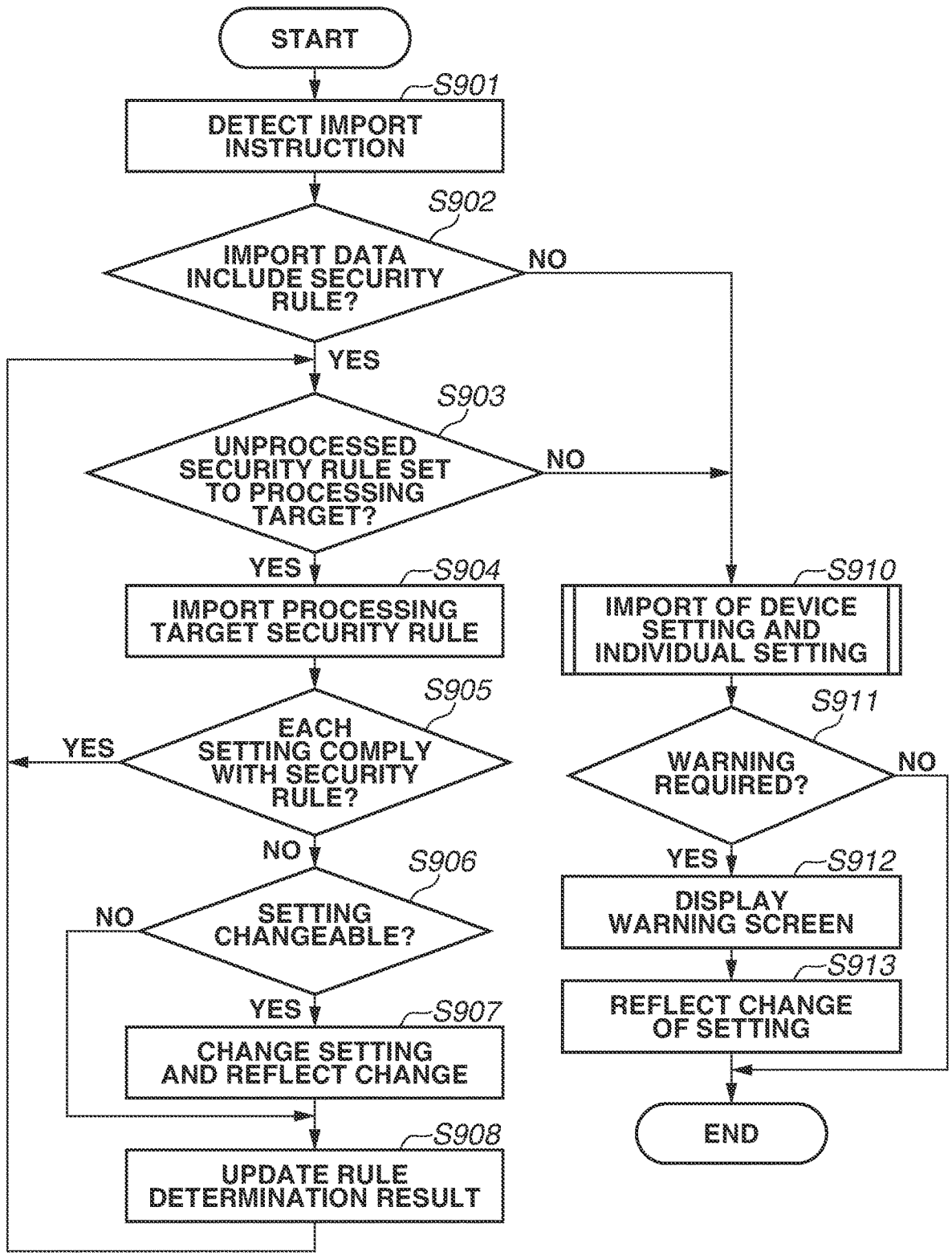
FIG. 9 is a flowchart illustrating an example of import processing.

FIG. 9 is a flowchart illustrating an example of import processing according to the present exemplary embodiment. Processing described with reference to flowcharts in FIGS. 9, 10 and 11, which are described below, are executed by each software module illustrated in FIG. 3. More specifically, the processing is realized by executing a program stored in the nonvolatile memory 202 or the auxiliary storage device 204 by the CPU 201 in the image forming apparatus 101.

In step S901, when an import instruction is input, the import unit 303 detects the import instruction and advances the processing to step S902. The import instruction is input (received), for example, from an external apparatus, such as the PC 102, via a predetermined communication medium, such as the LAN 110. When the import instruction is issued, an import data file or the like as an import source is specified, and the import data is input to (received by) the image forming apparatus 101 via the LAN 110. A recording medium, such as a USB memory is connected to an interface, not illustrated, of the image forming apparatus 101, and an import instruction may be input from the input device 206 to receive the import data recorded in the recording medium from the recording medium.

In step S902, the import unit 303 determines whether the import data includes the security rule. If it is determined that the import data includes the security rule (YES in step S902), the processing proceeds to step S903. Whereas if it is determined that the import data does not include the security rule (NO in step S902), the import unit 303 advances the processing to step S910.

FIGS. 5A to 5C are examples of the import data.

FIG. 5A is an example of the import data which includes only the security rule. Hereinbelow, the import data in FIG. 5A is denoted by import data A. The import data A includes two security rules. When the import data A is imported, in step S902, it is determined that the security rule is included.

FIG. 5B is an example of the import data which includes the security rule, the device setting, and the individual setting. Hereinbelow, the import data in FIG. 5B is denoted by import data B. When the import data B is imported, in step S902, it is determined that the security rule is included.

FIG. 5C is an example of the import data which includes only the device setting and the individual setting. Hereinbelow, the import data in FIG. 5C is denoted by import data C. When the import data C is imported, in step S902, it is determined that the security rule is not included.

It is returned to the descriptions of the flowchart in FIG. 9 hereinbelow.

In step S903, the import unit 303 performs processing for selecting one of the security rules which are not yet imported (not processed) among the security rules included in the import data and setting the selected one to a processing target. If the unprocessed security rule can be set to the processing target (YES in step S903), the import unit 303 advances the processing to step S904.

The processing is described using the example in FIG. 5A. When the processing in step S903 is first performed, the security rule of the "password complexity" is selected, and the processing in step S904 is performed. When the processing in step S903 is secondly performed, the security rule of the "password complexity" has been imported, and thus the security rule of the "key strength in SSL communication" is selected. When the processing in step S903 is further performed, there is no security rule which is not yet imported, and thus the processing in step S910 is performed.

In step S904, the import unit 303 registers the security rule set to the processing target in step S903 to the setting value management unit 301 and advances the processing to step S905. When the setting value management unit 301 imports the import data A in a state in FIG. 4A, the import data A becomes a state in FIG. 6A.

In step S905, the security rule check unit 302 checks the import data according to a changed point of the security rule registered in step S904 and determines whether all settings are in a state complying with the security rule based on the check result.

The security rule check in step S905 is described below using a case when the import data A is imported to the image forming apparatus 101 in a state of FIGS. 4A to 4C as an example.

When the import data A is imported, the security rule of the "password complexity" is changed from "more than two characters" to "more than four characters", and thus the security rule check unit 302 checks a setting related to the security rule of the "password complexity". The "SMTP password" in FIG. 4B includes only two characters, like "ab", and is determined as not complying with the security rule. The "SMB password" includes four characters, like "abcd", and is determined as complying with the security rule.

Further, the "key strength in SSL communication" is described using an example. When the import data A imported, the security rule of the "key strength in SSL communication" is changed from "arbitrary" to "strong", and thus the security rule check unit 302 checks a setting related to the security rule of the "key strength in SSL communication". In the "SSL certificate" setting in FIG. 4B, the "certificate 1" is selected. For the sake of description, it is regarded that the "certificate 1" and a "certificate 2" are registered in the image forming apparatus 101, and the "certificate 1" and the "certificate 2" are respectively created based on RAS 1024 bit and RSA 2048 bit. In this case, the "certificate 1" of RAS 1024 bit is set to the "SSL certificate" setting, and it is determined that the setting does not comply with the security rule.

It is returned to the descriptions of the flowchart in FIG. 9 hereinbelow.

In step S905, if the security rule check unit 302 determines that the all settings are in the state complying with the security rule (YES in step S905), the processing proceeds to step S903, and the import unit 303 advances the processing to a next security rule. Whereas if the security rule check unit 302 determines that there is any setting which does not comply with the security rule as a result of the check (NO in step S905), the processing proceeds to step S906.

In step S906, the setting value changeability determination unit 306 determines whether all settings which are determined as not complying with the security rule in step S905 can be changed to a state complying with the security rule by automatically changing (correcting) the setting value.

Determination processing in step S906 is described below using FIG. 4B as an example.

The "SMTP password" is determined as unchangeable since the value is a character string. The "SMB password" is also determined as unchangeable since the value is a character string. The "SSL certificate" setting is determined as changeable since it is selected from the certificates registered in the device.

In step S906, if the setting value changeability determination unit 306 determines that any of the setting can be changed (corrected) (YES in step S906), the processing proceeds to step S907. Whereas if the setting value changeability determination unit 306 determines that all settings cannot be changed (corrected) (NO in step S906), the processing directly proceeds to step S908. In step S907, the setting value change unit 307 changes (corrects) a value of the setting which is determined as changeable in step S906 and updates the setting in the setting value management unit 301 with the changed value. Then, the processing proceeds to step S908.

The processing in step S907 is described below using the case when the import data A is imported to the image forming apparatus 101 in the state of FIGS. 4A to 4C as an example. In this case, in step S907, the setting of the "SSL certificate" which is determined as changeable in step S906 is changed. The "SSL certificate" setting has the related rule number 415 "2", the setting of the relevant rule is referred to. Here, the relevant rule is the "key strength in SSL communication" in FIG. 5A, and its value is "strong". Thus, the "certificate 2" which is created in RSA 2048 bit of which the "key strength in SSL communication" corresponds to "strong" is automatically selected from among the certificates registered in the image forming apparatus 101. In the above-described example, a value complying with the rule can be selected, however, there is a case in which a value complying with the rule is not included in options. Such a case is handled similarly to an unchangeable setting, and the processing proceeds to step S908.

In step S908, the setting value management unit 301 updates the rule determination result 416 based on the determination result in step S906 and the correction result in step S907 and stores information to be warned or the like.

The processing in step S908 is described below using the case when the import data A is imported to the image forming apparatus 101 in which the settings in FIGS. 4A to 4C are stored in the setting value management unit 301 as an example. As a result of the processing in step S904 to step S907, the settings stored in the setting value management unit 301 become those in FIGS. 6A to 6C. FIGS. 6A to 6C are examples of setting values stored in the setting value management unit 301 after the import is performed.

FIG. 6A shows the security rule. The rules are registered as the import data A shown in FIG. 5A.

FIG. 6B shows the device setting. The "SMTP password" is in a state not complying with the security policy as described above, and thus is stored as a warning target. Accordingly, "NG (warning is required)" is stored in the rule determination result 416. In addition, the "SMB password" is in a state complying with the security policy as described above, and thus is stored as out of a warning target. Accordingly, "OK" is stored in the rule determination result 416. Further, the "SSL certificate" setting is in a state that the "certificate 2" is set as described above, and thus in a state complying with the security policy. However, the setting is changed by the setting value change unit 307 and is stored as the warning target. Accordingly, "OK (warning is required)" is stored in the rule determination result 416.

FIG. 6C shows the individual setting. Similar to the device setting shown in FIG. 6B, a determination result of whether a value complying with the security policy is set to each of settings stored for each user is stored in the rule determination result 416.

When the processing in step S908 is finished, the processing proceeds to step S903, and the import unit 303 advances the processing to a next security rule. Then, in step S903, when import of all security rules are completed, and an unprocessed security rule cannot be set to the processing target (NO in step S903), the import unit 303 advances the processing to step S910.

In step S910, the import unit 303 imports the device setting and the individual setting. By the processing in step S910, the device setting and the individual setting are imported, and the imported security rule is checked. Details of the processing are described below with reference to the flowchart in FIG. 10.

When the processing in step S910 is completed, the processing proceeds to step S911. In step S911, the warning unit 308 determines whether a warning is required. If the settings registered in the setting value management unit 301 include a setting of which rule determination result 416 is "NG (warning is required)" or "OK (warning is required)", the warning unit 308 determines that the warning is required. Whereas if a setting of which rule determination result 416 is "NG (warning is required)" or "OK (warning is required)" is not included, it is determined that the warning is not required.

If it is determined that the warning is not required (NO in step S911), the processing in the present flowchart is directly terminated. Whereas if it is determined that display of the warning screen is required (YES in step S911), the warning unit 308 displays the warning screen.

FIG. 7 illustrates an example of the warning screen displayed when import processing is performed. The warning screen illustrated in FIG. 7 is a merely example, and contents of a message and configuration of the screen are not particularly limited.

In the warning screen illustrated in FIG. 7, a warning content about the setting of which rule determination result is "OK (warning is required)" is displayed at an uppermost part as shown in a warning 701. In the example in FIG. 7, the warning content about the "SSL certificate" setting is displayed.

Next, as shown in a warning 702, a warning content about the setting of which rule determination result is "NG (warning is required)" is displayed. The warning 702 includes a warning display 702a about the device setting of which rule determination result is "NG (warning is required)" and a warning display 702b about the individual setting of a user who instructed execution of the import processing of which rule determination result is "NG (warning is required)".

First, the warning display 702a about the device setting of which rule determination result is "NG (warning is required)" is described. In the case of the device setting, if the application range 413 is the "device", the administrative user can correct the setting on the spot. If the application range 413 is the "external", there is no point to correct the setting on the spot. Thus, when the application range 413 is the "device", as shown in the warning display 702a, an input screen for prompting a user to input a value complying with the security rule is displayed on the warning screen. In the example in the warning display 702a, a warning about the "SMTP password" and an input screen are displayed. A user input by a user who instructed execution of the import processing can be received from the input screen of the warning display 702a to change the warned setting value (setting value corresponding to the device setting).

Next, the warning display 702b about the individual setting of a user who instructed execution of the import processing of which rule determination result is "NG (warning is required)" is described.

The individual setting of the user who instructed execution of the import processing is similar to the above described the device setting. If the application range 413 is the "device", the administrative user can change the setting on the spot, and if the application range 413 is the "external", there is no point to correct the setting on the spot. Thus, in the case of the individual setting of the user who instructed execution of the import processing, when the application range 413 is the "device", an input screen for prompting a user to input a value complying with the security rule is displayed on the warning screen as shown in the warning display 702b. The warning display 702b is an example when the administrative user who instructed execution of import is assumed to be a "user B", and a warning based on the check result of the individual setting in FIG. 6C is displayed. A user input by the user who instructed execution of the import processing can be received from the input screen of the warning display 702b to change the warned setting value (setting value corresponding to the individual setting of the relevant user).

The warning display 702b in FIG. 7 is an example in which a warning about all settings having "NG (warning is required)" in the individual settings of the "user B" and the input screen therefor are displayed. However, the number of the warnings and input screens can be very large in practice. Thus, instead of displaying on the warning screen shown in FIG. 7 at the import processing, a warning may be issued at a timing when the setting value is used. Therefore, the warning screen at the import processing may issue a warning about only a login password of the "user B".

Next, as shown in a warning 703, a user identifier of a user who is other than the user instructed execution of the import processing and whose rule determination result of the individual setting is "NG (warning is required)" or "OK (warning is required)" is displayed. In the example in the warning 703, user identifiers of a "user A" and the "user B" are displayed. In the descriptions of the above warning display 702b, it is assumed that the administrative user who instructed execution of the import is the "user B". However, in the description of the warning 703, the administrative user who instructed execution of the import is a user other than the "user B".

When a change (correction) of the setting is input on the warning display 702a or the warning display 702b, and an OK button 704 is pressed, the security rule check unit 302 determines whether the correction complies with the security rule. When the correction complies with the security rule, the setting value change unit 307 reflects the change (correction) of the setting. When a value input to the input screen on the warning display 702a or the warning display 702b does not comply with the security rule, the value is not reflected, and the warning unit 308 issues a warning about the fact and prompts a user to input again the setting value.

When the warning screen illustrated in FIG. 7 is displayed, the processing proceeds to step S913. In step S913, when the warning unit 308 detects an input of a changed setting value from a user (when detecting pressing of the OK button 704 in a state that a value is input to the warning display 702a or the warning display 702b), the security rule check unit 302 checks the above-described input value. If the input value complies with the security rule, the setting value change unit 307 updates the value in the setting value management unit 301 with the changed input setting value. Then, the processing in the present flowchart is terminated.

Figure 10:
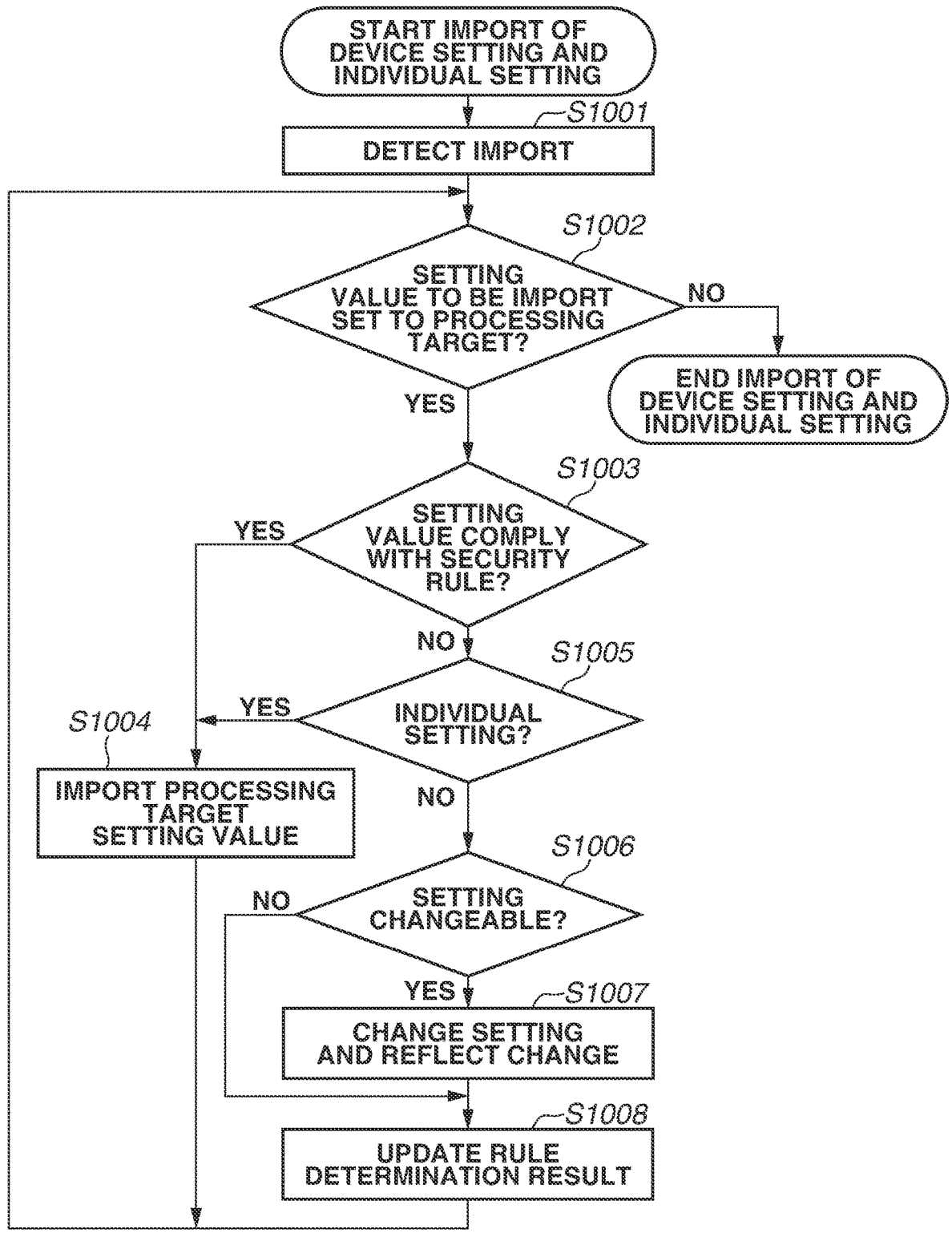
FIG. 10 is a flowchart illustrating import processing of a device setting and an individual setting in detail.

FIG. 10 is a flowchart illustrating details of import processing of the device setting and the individual setting in step S910 in FIG. 9.

In step S1001, the import unit 303 detects the device setting value and the individual setting value included in the import data corresponding to the import instruction detected in step S901 in FIG. 9 (import detection). Next, in step S1002, the import unit 303 selects one setting value which is included in the import data and not yet imported and sets as a processing target. If the unprocessed setting value can be set to a processing target (YES in step S1002), the import unit 303 advances the processing to step S1003.

In step S1003, the security rule check unit 302 checks the setting value set as the processing target in step S1002 based on the security rule and determines whether the setting value complies with the security rule. If it is determined that the setting value complies with the security rule (YES in step S1003), the import unit 303 advances the processing to step S1004 to import the setting value set as the processing target in step S1002. Accordingly, the setting of the processing target is registered to the setting value management unit 301. At that time, the setting value management unit 301 registers the value based on the check result of the security rule check unit 302 in step S1003 to the rule determination result 416. In this case, it is determined in step S1003 that the value complies with the security rule, "OK" is registered to the rule determination result 416. When the processing in step S1004 is completed, the processing proceeds to step S1002, and the import unit 303 advances the processing to a next setting value.

On the other hand, in step S1003, if the security rule check unit 302 determines that the value set as the processing target in step S1002 does not comply with the security rule (NO in step S1003), the processing proceeds to step S1005.

In step S1005, the import unit 303 determines whether the setting value which is determined not to comply with the security rule in step S1003 is a setting value corresponding to the individual setting. If it is determined as the setting value corresponding to the individual setting (YES in step S1005), the import unit 303 advances the processing to step S1004 to import the setting value which is determined not to comply with the security rule and corresponds to the individual setting. In this case, it is determined in step S1003 that the value does not comply with the security rule, the setting value management unit 301 registers "NG (warning is required)" to the rule determination result 416. More specifically, in the case of the setting value corresponding to the individual setting, the setting value is objected to the import processing regardless of the security rule and registered to the setting value management unit 301.

On the other hand, in step S1005, if the import unit 303 determines that the setting value does not correspond to the individual setting (determines as the setting value corresponding to the device setting) (NO in step S1005), the processing directly proceeds to step S1006. In step S1006, the setting value changeability determination unit 306 determines whether the setting value which is determined not to comply with the security rule and corresponds to the device setting in step S1003 can be automatically changed (corrected) to a value complying with the security rule. If the setting value changeability determination unit 306 determines that the setting value can be changed to a value complying with the security rule (YES in step S1006), the processing proceeds to step S1007. In step S1007, the setting value change unit 307 changes (corrects) the setting value determined as a value not complying with the security rule to a value complying with the security rule and updates the setting in the setting value management unit 301 with the changed value. In step S1008, the import unit 303 imports the setting value of the processing target. Then, the processing proceeds to step S1009.

In step S1006, if the setting value changeability determination unit 306 determines that the setting value which is determined not to comply with the security rule and corresponds to the device setting in step S1003 cannot be automatically changed (corrected) to a value complying with the security rule (NO in step S1006), the processing directly proceeds to step S1009.

In step S1009, the setting value management unit 301 updates the rule determination result 416 in the setting value management unit 301 based on the determination result in step S1006 and the correction result in step S1007 and stores information to be warned or the like. If it is determined in step S1006 that the setting value cannot be changed (corrected), the rule determination result 416 is updated with "NG (warning is required)". Further, if the setting value is changed (corrected) in step S1007, the rule determination result 416 is updated with "OK (warning is required)". When the processing in step S1009 is completed, the processing proceeds to step S1002, and the import unit 303 advances the processing to a next setting value.

In step S1002, if the import unit 303 completes the import of all settings included in the import data and cannot set an unprocessed setting to a processing target (NO in step S1002), the processing in the present flowchart is terminated.

As described above, if a setting value of an import target corresponds to the device setting and complies with the security rule (when the import processing is not prohibited by the security rule), the import processing of the setting value is executed. Further, if the setting value corresponding to the device setting does not comply with the security rule (when the import processing is prohibited by the security rule), the import processing of the setting value is not executed. Furthermore, if a setting value of an import target corresponds to the individual setting, the import processing of the setting value can be executed regardless of the security rule.

In the descriptions of the above flowcharts, if a setting value as a target of the import processing corresponds to the individual setting, the setting value is subjected to the import processing as it is even if the setting value does not comply with the security rule. However, regarding a setting value which can be automatically corrected, the individual setting can be automatically corrected and reflected similar to the device setting.

Figure 11:
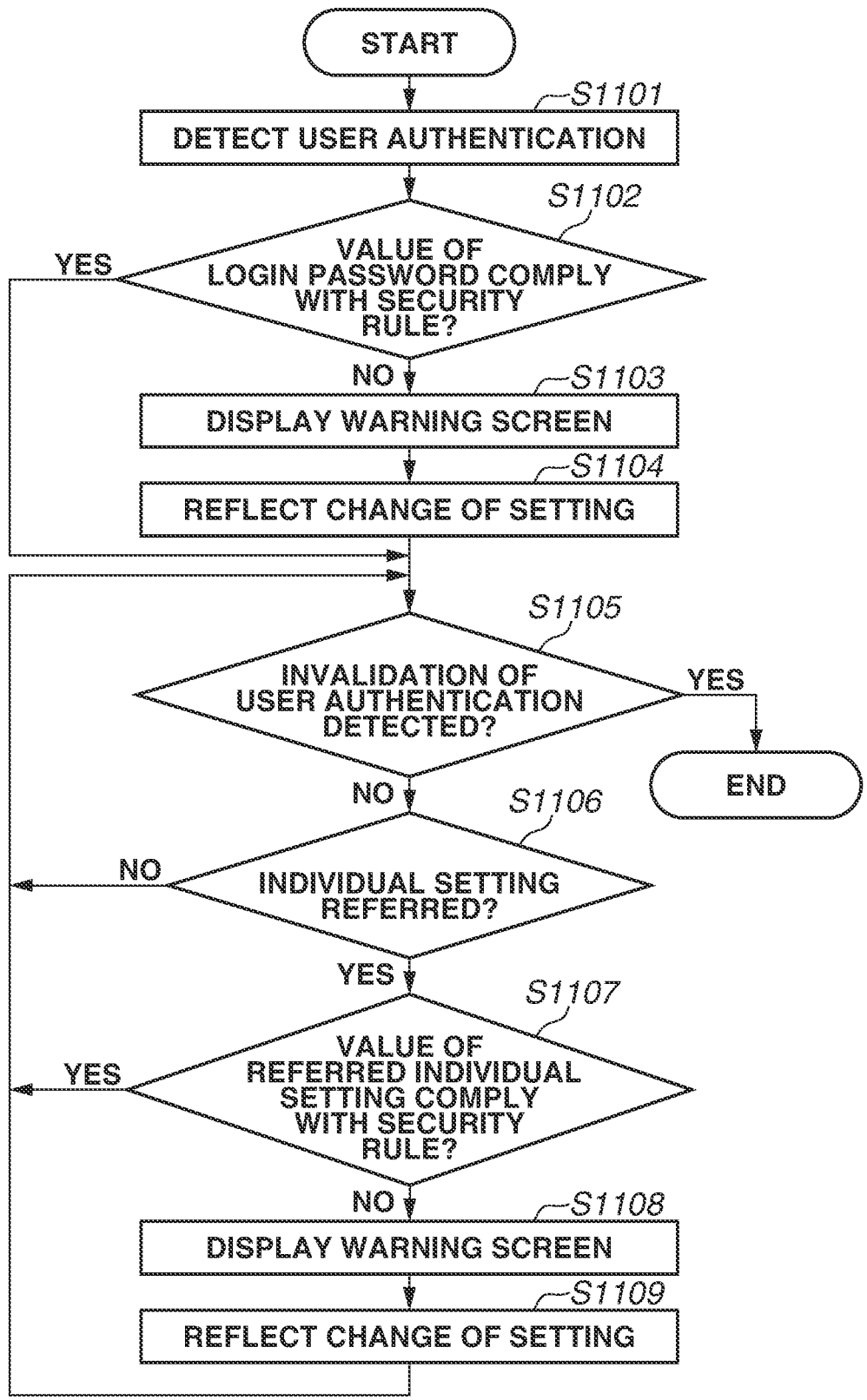
FIG. 11 is a flowchart illustrating an example of processing performed when a user uses the image forming apparatus.

FIG. 11 is a flowchart illustrating an example of processing when a user uses the image forming apparatus 101.

When a user logs in the image forming apparatus 101, in step S1101, the security rule check unit 302 detects user authentication (login of the user) and advances the processing to step S1102. In step S1102, the security rule check unit 302 checks whether a login password of the user whose user authentication is detected in step S1101 has a value complying with the security rule. The check in this step may simply refer to the rule determination result in the setting value management unit 301.

If the security rule check unit 302 determines that the login password of the user has a value complying with the security rule (YES in step S1102), the processing directly proceeds to step S1105. Whereas if the security rule check unit 302 determines that the login password of the user does not have a value complying with the security rule (NO in step S1102), the processing proceeds to step S1103.

In step S1103, the warning unit 308 displays the warning screen prompting a user to reset the login password.

Figure 8A:
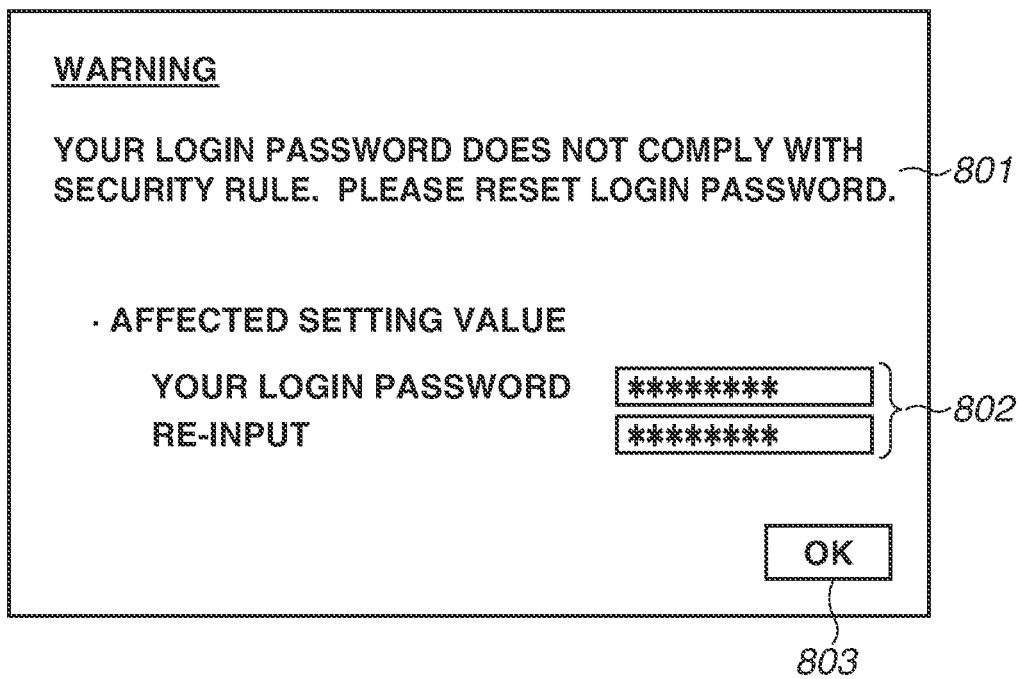
FIGS. 8A and 8B illustrates examples of warning screens when a user uses the image forming apparatus.
Figure 8B:
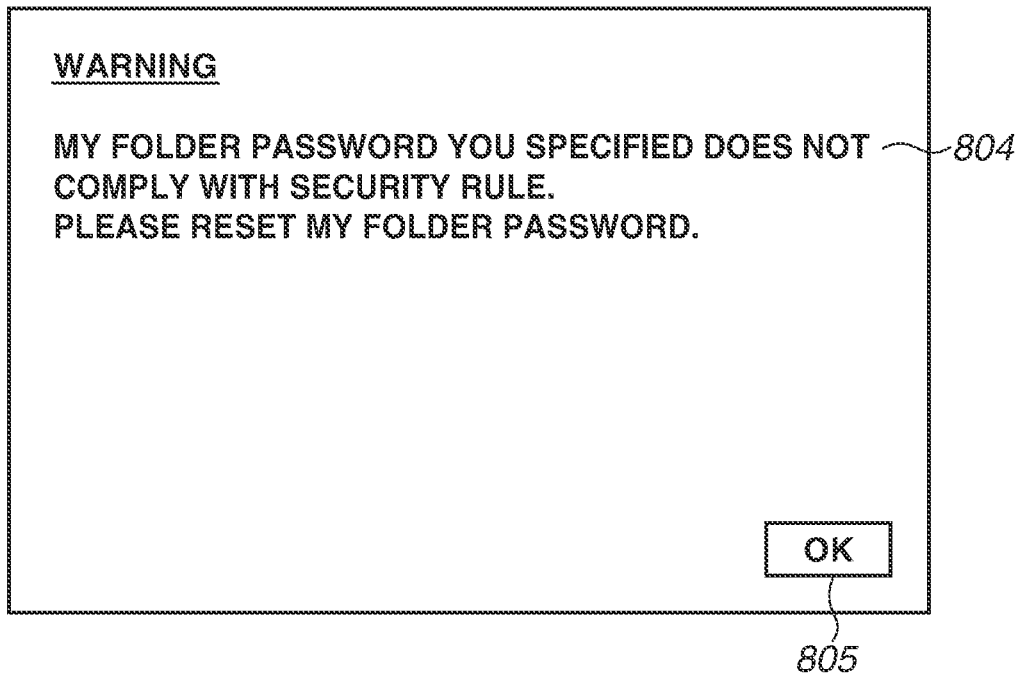

FIGS. 8A and 8B are examples of the warning screens which are displayed when a user uses the image forming apparatus 101. FIG. 8A shows the warning screen displayed when a user logs in the image forming apparatus 101.

FIG. 8A includes a warning message 801, a change input unit 802 of a login password, and an OK button 803. When a change (correction) of a setting of the login password is input in the change input unit 802 and the OK button 803 is pressed, the security rule check unit 302 determines whether the login password complies with the security rule. If the login password complies with the security rule, the setting value change unit 307 reflects the change (correction) of the login password. If the login password input to the change input unit 802 does not comply with the security rule, the change of the login password is not reflected, and the warning unit issues a warning about the fact and prompts a user to input again the login password.

When the warning screen illustrated in FIG. 8A is displayed, the processing proceeds to step S1104. In step S1104, if the warning unit 308 detects the change input of the login password of the user (when detecting pressing of the OK button 803 in a state that the login password is input to the change input unit 802), the security rule check unit 302 checks the input login password. If the login password complies with the security rule, the setting value change unit 307 updates the value in the setting value management unit 301 with the changed input login password. Then, the processing proceeds to step S1105.

In step S1105, the security rule check unit 302 determines whether invalidation of the user authentication (logout of the user) is detected. If the security rule check unit 302 determines that the invalidation of the user authentication (logout of the user) is not detected (NO in step S1105), the processing proceeds to in step S1106.

In step S1106, the security rule check unit 302 monitors a reference of the setting value corresponding to the individual setting of the user who is currently logging in. The image forming apparatus 101 is configured that when a user selects execution of any function, the function refers to the setting value as necessary. In step S1106, if it is determined that the setting value corresponding to the individual setting of the user currently logging in is referred to (YES in step S1106), the processing proceeds to step S1107.

In step S1107, the security rule check unit 302 checks whether the referred setting value corresponding to the individual setting complies with the security rule. The check in this step may simply refer to the rule determination result in the setting value management unit 301. If the security rule check unit 302 determines that the setting value complies with the security rule (YES in step S1107), the processing proceeds to step S1105.

On the other hand, if the security rule check unit 302 determines that the setting value does not comply with the security rule (NO in step S1107), the processing proceeds to step S1108. In step S1108, the warning unit 308 displays the warning screen about the referred setting value corresponding to the individual setting. If the application range 413 of the referred setting value corresponding to the individual setting is the "external", there is no point to correct the setting on the spot. Thus, a warning message 804 as shown in FIG. 8B is displayed on the warning screen. FIG. 8B shows the warning screen displayed when the setting value corresponding to the individual setting is referred to. If the application range 413 of the referred setting value corresponding to the individual setting is the "device", the setting value can be corrected on the spot. Thus, a warning screen prompting a user to correct (a warning screen similar to that in FIG. 8A) is displayed, and the processing proceeds to step S1109.

In the case that the warning screen illustrated in FIG. 8B is displayed, in step S1109, when the warning unit 308 detects pressing of an OK button 805, the processing proceeds to step S1105. Further, if the warning screen illustrated in FIG. 8A is displayed, in step S1109, the processing similar to that in step S1104 is performed. More specifically, when the warning unit 308 detects a change input of the setting value by a user, the security rule check unit 302 checks the input setting value. Further, if the setting value complies with the security rule, the setting value change unit 307 updates the value in the setting value management unit 301 with the changed input setting value. Then, the processing proceeds to step S1105.

In step S1105, if the security rule check unit determines that the invalidation of the user authentication (logout of the user) is detected (YES in step S1105), the processing in the present flowchart is terminated.

When a warning is issued in step S1108, regarding a setting value which can be automatically corrected, the setting value may be automatically corrected, and then a warning about the fact may be issued as in the warning 701 in FIG. 7. Further, automatically corrected value may be displayed on the warning screen as a correction candidate without being reflected and reflected after approval by a user.

As described above, if there is any individual setting not complying with the security rule in the image forming apparatus 101, the individual setting is imported, and then, the individual setting can be corrected to the one complying with the security rule at a timing when a general user uses the image forming apparatus 101. Accordingly, the administrative user who manages the settings can reduce his/her time and effort while substantially complying with the security rule. Thus, a setting value can be flexibly imported while considering the security rule and thus can be efficiently managed in an environment in which the image forming apparatus is operated in compliance with the security rule.

For example, in the case that the administrative user or the like distributes a file including a group of setting values to a plurality of image forming apparatuses (for example, three or more image forming apparatuses including 101a and 101b) in a batch to perform import processing, setting values included in the file, such as authentication information of a general user other than the administrative user, may be sometimes not compliant with the security rule. In such a case, if reflection of the setting is prohibited in compliance with the security policy, the general user cannot log in the image forming apparatus using his/her own user account.

Thus, the exemplary embodiment according to the present invention can provide a mechanism of import processing on the image forming apparatus side which enables the image forming apparatus to flexibly import a setting value while taking the security rule into consideration.

In the above, it is described that only the administrative user can instructs the import processing of the setting value. However, a general user may perform import processing by being limited to setting values of the individual setting of the relevant user.

Configurations and contents of the above-described various types of data pieces are not limited to the above-described ones, and data can include various configuration and contents according to an application and a purpose.

The exemplary embodiment of the present invention is described above. However, the exemplary embodiment according to the present invention can be realized by, for example, a system, an apparatus, a method, a program, or a recording medium. More specifically, the present invention can be applied to a system including a plurality of devices and an apparatus including a single device.

Further, configurations with combinations of the above-described exemplary embodiments are all included in the present invention.

According to the above-described exemplary embodiment, time and effort in management can be reduced by flexibly importing a setting value while taking the security rule into consideration. Therefore, an administrator can substantially comply with the security rule and efficiently manage setting values.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
one or more processors; and
a memory storing instructions, which when executed by the one or more processors, cause the image forming apparatus to perform operations comprising:
managing a security rule;
receiving a setting value to be a target of import processing;
determining whether the setting value to be the target of the import processing is a device setting value;
determining whether the setting value to be the target of the import processing satisfies the security rule;
executing importing of the device setting value in a case where it is determined that the setting value is the device setting value and it is determined that the setting value satisfies the security rule;
determining whether the device setting value is automatically changeable so that the device setting value satisfies the security rule in a case where it is determined that the setting value is the device setting value and it is determined that the setting value does not satisfy the security rule; and
automatically changing the device setting value so that the setting value satisfies the security rule in a case where it is determined that the device setting value is automatically changeable so that the device setting value satisfies the security rule,
wherein the device setting value is not imported in a case where it is determined that the device setting value is not automatically changeable so that the device setting value satisfies the security rule,
wherein it is determined that the device setting value is automatically changeable so that the device setting value satisfies the security rule and the device setting value is automatically changed so that the setting value satisfies the security rule, in a case where the device setting value is the device setting value being an SSL certificate setting.

2. The image forming apparatus according to claim 1, wherein it is determined that the device setting value is not automatically changeable so that the device setting value satisfies the security rule and the device setting value is not imported, in a case where the device setting value is a password.

3. A method for controlling an image forming apparatus, the method comprising:
managing a security rule;
receiving a setting value to be a target of import processing;
determining whether the setting value to be the target of the import processing is a device setting value;
determining whether the setting value to be the target of the import processing satisfies the security rule;
executing importing of the device setting value in a case where it is determined that the setting value is the device setting value and it is determined that the setting value satisfies the security rule;
determining whether the device setting value is automatically changeable so that the device setting value satisfies the security rule in a case where it is determined that the setting value is the device setting value and it is determined that the setting value does not satisfy the security rule; and
automatically changing the device setting value so that the setting value satisfies the security rule in a case where it is determined that the device setting value is automatically changeable so that the device setting value satisfies the security rule,
wherein the device setting value is not imported in a case where it is determined that the device setting value is not automatically changeable so that the device setting value satisfies the security rule, wherein it is determined that the device setting value is automatically changeable so that the device setting value satisfies the security rule and the device setting value is automatically changed so that the setting value satisfies the security rule, in a case where the device setting value is the device setting value being an SSL certificate setting.

4. The method according to claim 3, wherein it is determined that the device setting value is not automatically changeable so that the device setting value satisfies the security rule and the device setting value is not imported, in a case where the device setting value is a password.

5. A non-transitory computer-readable medium storing executable instructions, which when executed by one or more processors of an image forming apparatus, cause the image forming apparatus to perform operations comprising:
managing a security rule;
receiving a setting value to be a target of import processing;
determining whether the setting value to be the target of the import processing is a device setting value;
determining whether the setting value to be the target of the import processing satisfies the security rule;
executing importing of the device setting value in a case where it is determined that the setting value is the device setting value and it is determined that the setting value satisfies the security rule;
determining whether the device setting value is automatically changeable so that the device setting value satisfies the security rule in a case where it is determined that the setting value is the device setting value and it is determined that the setting value does not satisfy the security rule; and
automatically changing the device setting value so that the setting value satisfies the security rule in a case where it is determined that the device setting value is automatically changeable so that the device setting value satisfies the security rule,
wherein the device setting value is not imported in a case where it is determined that the device setting value is not automatically changeable so that the device setting value satisfies the security rule,
wherein it is determined that the device setting value is automatically changeable so that the device setting value satisfies the security rule and the device setting value is automatically changed so that the setting value satisfies the security rule, in a case where the device setting value is the device setting value being an SSL certificate setting.

6. The non-transitory computer-readable medium according to claim 5, wherein it is determined that the device setting value is not automatically changeable so that the device setting value satisfies the security rule and the device setting value is not imported, in a case where the device setting value is a password.

* * * * *